Nov. 25, 1969  R. F. SUMPTION  3,480,449
METHOD FOR PROVIDING STUFFED FOOD CASINGS HAVING FLATTENED ENDS
Original Filed June 6, 1967  4 Sheets-Sheet 1
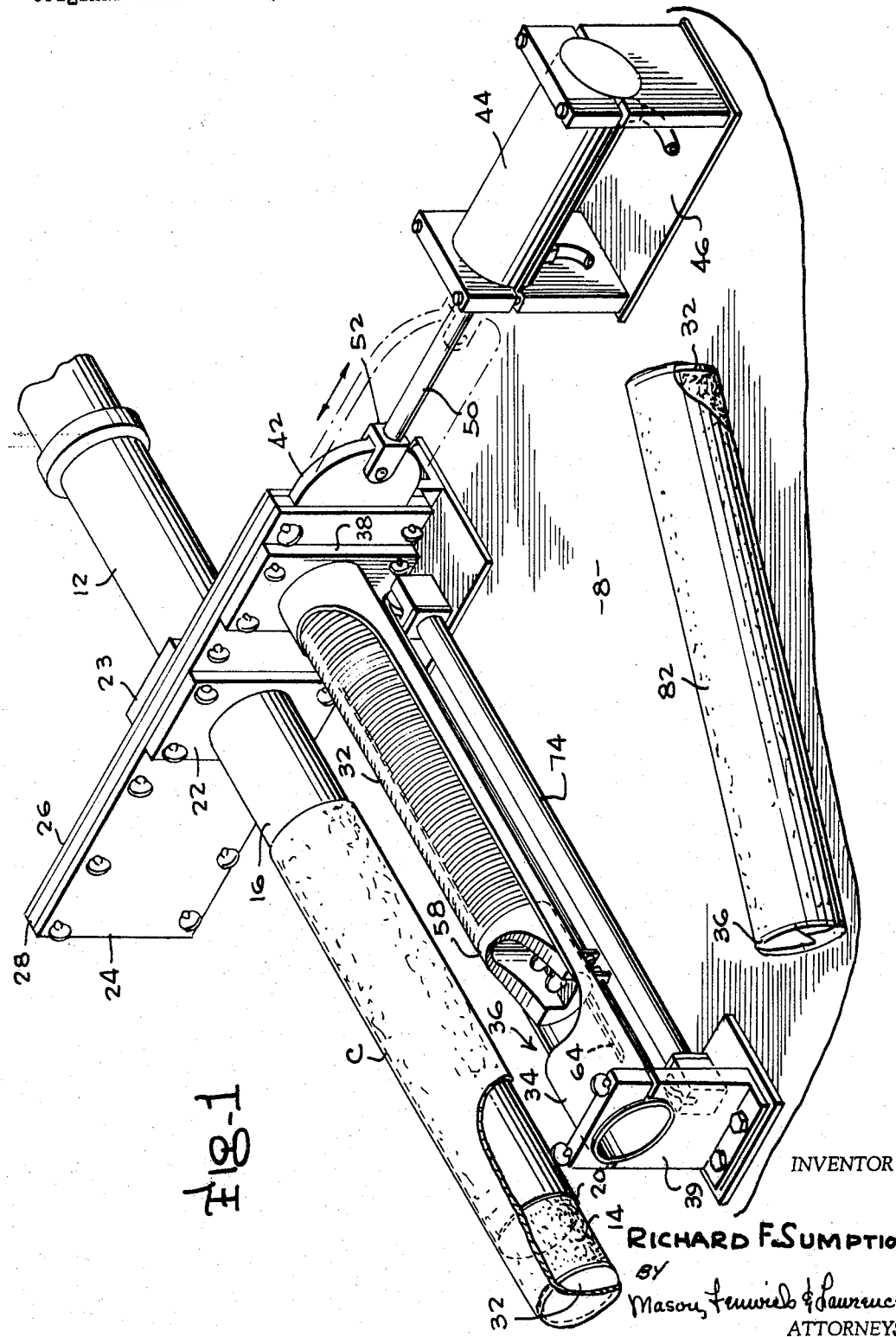
INVENTOR
RICHARD F. SUMPTION
BY
Mason, Fenwick & Lawrence
ATTORNEYS

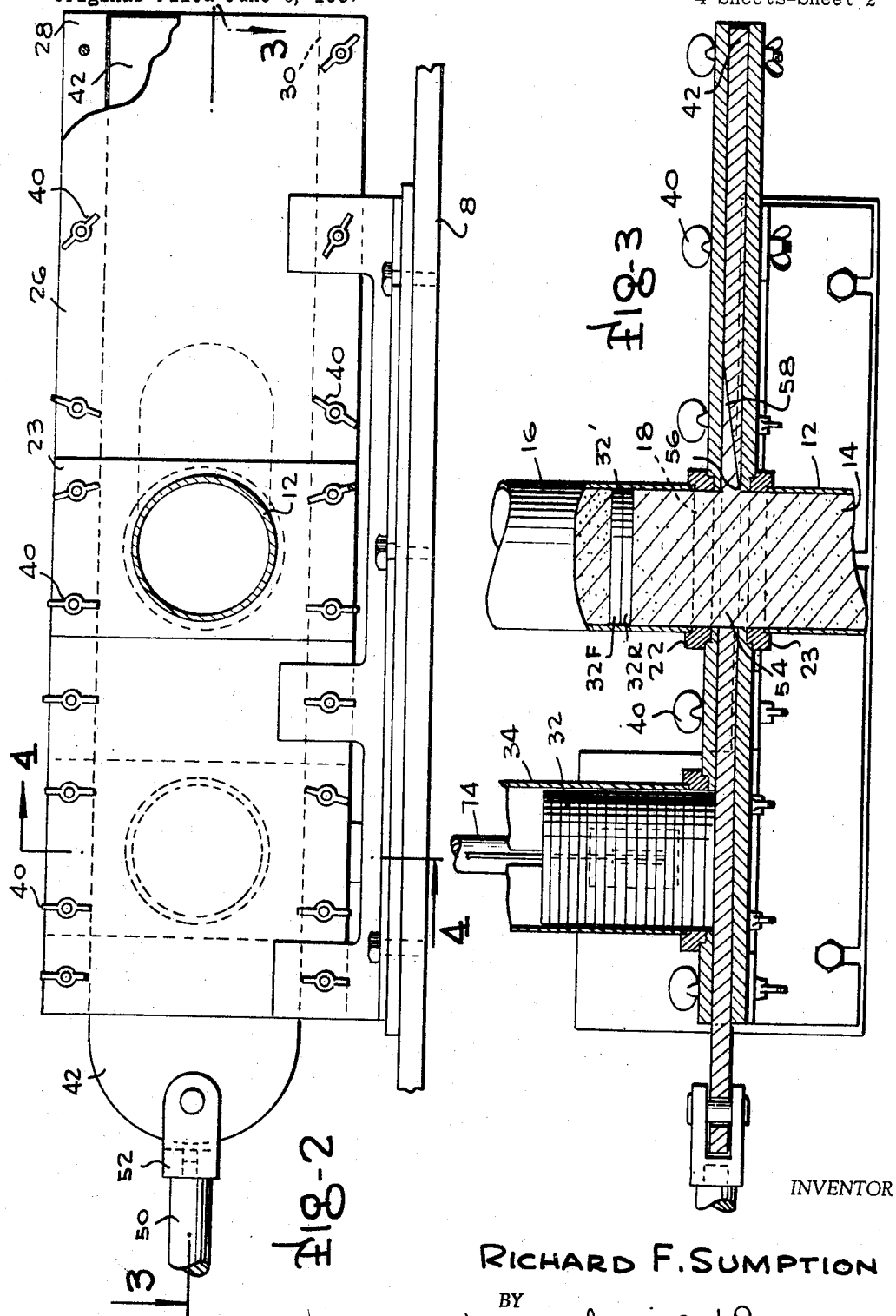

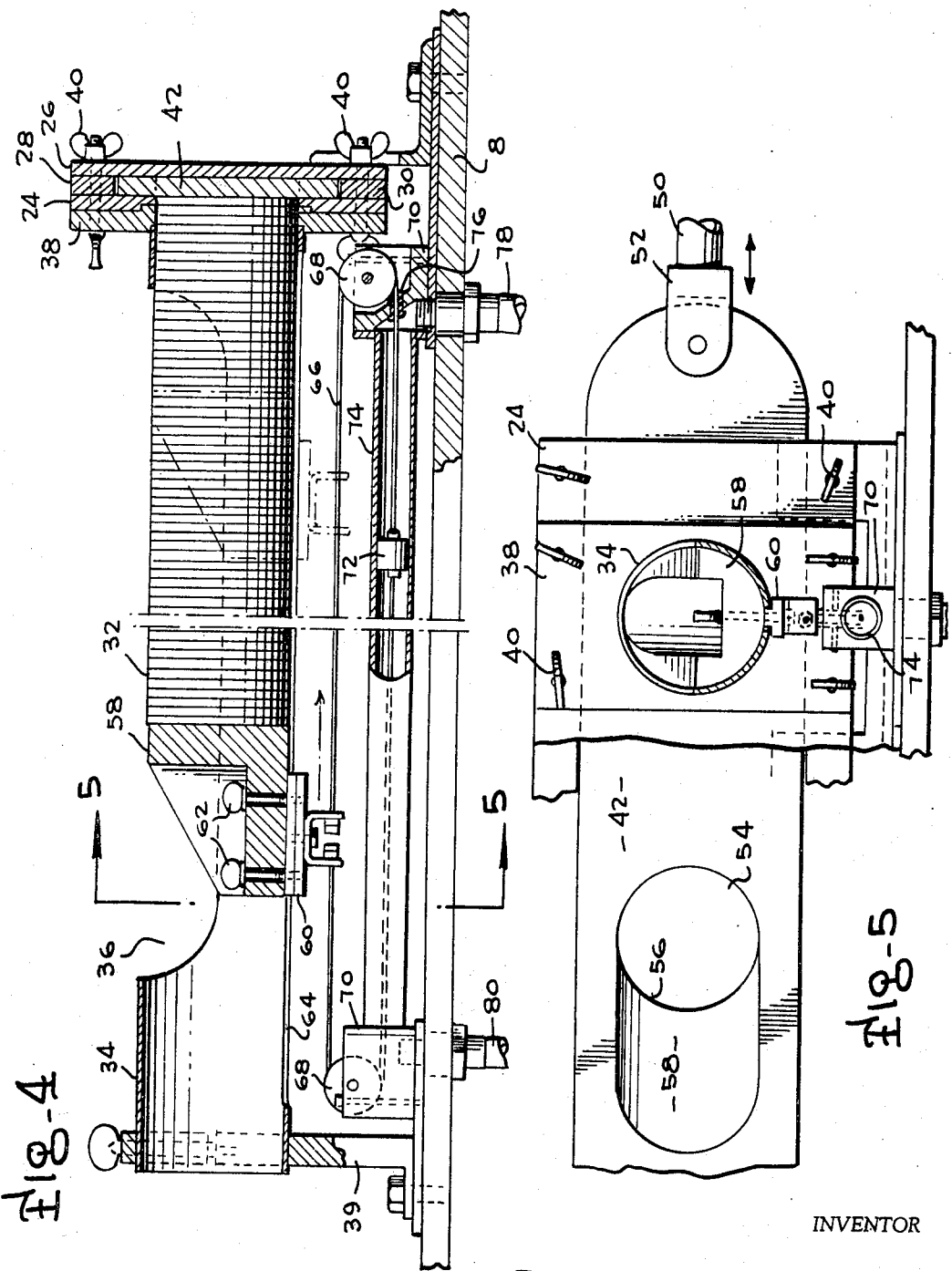

Nov. 25, 1969 — R. F. SUMPTION — 3,480,449
METHOD FOR PROVIDING STUFFED FOOD CASINGS HAVING FLATTENED ENDS
Original Filed June 6, 1967 — 4 Sheets-Sheet 4
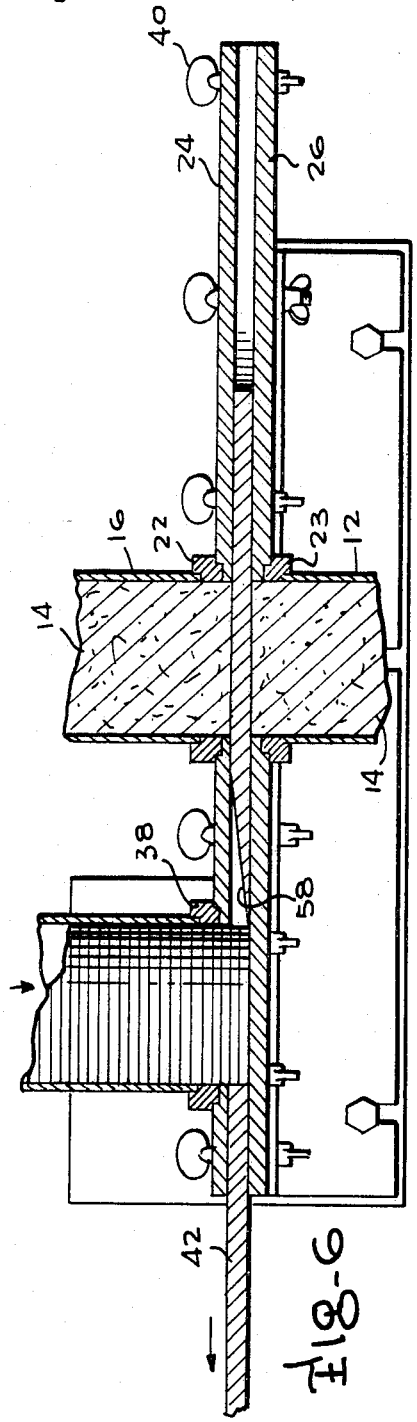
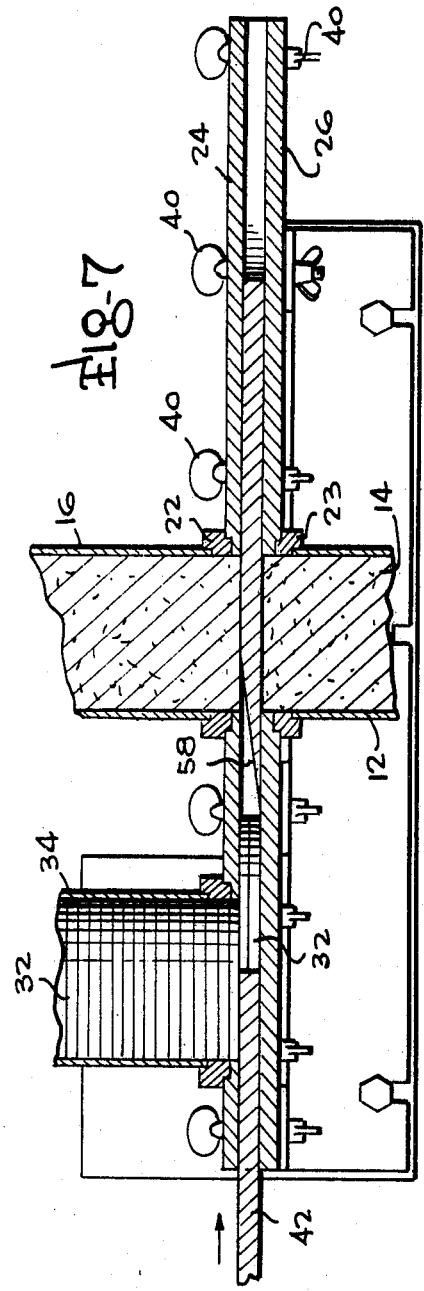
INVENTOR
RICHARD F. SUMPTION
BY Mason, Fenwick & Lawrence
ATTORNEYS

United States Patent Office 3,480,449
Patented Nov. 25, 1969

3,480,449
METHOD FOR PROVIDING STUFFED FOOD CASINGS HAVING FLATTENED ENDS
Richard F. Sumption, Portsmouth, Va., assignor to Gwaltney Incorporated, Smithfield, Va., a corporation of Virginia
Original application June 6, 1967, Ser. No. 643,906. Divided and this application Mar. 3, 1969, Ser. No. 803,631
Int. Cl. B65b 3/00
U.S. Cl. 99—175
2 Claims

ABSTRACT OF THE DISCLOSURE

A method for forming stuffed food products by insertion of pairs of separator elements in a tubular extrusion mold to separate ground food products being extruded from the mold into discrete batches in elongated form with flattened ends for insertion into discrete casings.

---

This is a division of application Ser No. 643,906, filed June 6, 1967.

Background of the invention

This invention relates to the field of food products and more specifically, to the field of machines and methods for providing stuffed products having flattened ends.

It is well known that most stuffed food products are in the form of a generally cylindrical central portion having tapered crinkled ends as a result of tieing or clamping of the ends of the casing to retain the stuffing therein. Such food products stuffing can be in the form or raw, smoked or cooked meat, sausage, pudding, dairy products or the like. The crinkled end portions of such stuffed casing food products are not aesthetically appealing and are additionally undesirable since the food product contained within such cannot be sliced to provide slices of unitary sizes. This problem is of particular concern to restaurants and the like wherein the wastage of the food product in the tapered end portions can result in considerable economic loss.

The need for stuffed casing food products of constant diameter is recognized in U.S. Patent No. 2,886,073 which discloses a small manually operated apparatus for providing such packages. However, the device of said patent, while providing a satisfactory product, is slow in operation and requires a number of manual operations for each product produced. This invention, on the other hand, provides the means for automatically rapidly forming such constant diameter stuffed casing food products with a minimum of manual operation and maximum efficiency. The invention provides both an apparatus and method in which a constant flow or a rapidly cycled intermittent flow of comminuted food product is maintained to rapidly fill casings without undue interruption, as opposed to the batch-type operation of the aforementioned patent.

Summary of the invention

It is the object of this invention to provide a new and improved apparatus and method for forming stuffed casing food products.

Achievement of the object of this invention is enabled in a preferred manner by the provision of an elongated tubular hollow mold member into which comminuted food products are continuously or intermittently introduced from a supply conduit or the like for passage through the hollow tube and subsequent extrusion into discrete casings. A feed means removes a pair of flat substantially ridged separator elements from a storage magazine for insertion into the hollow tubular mold at desired time intervals. Each pair of separator elements serves to divide the food product in the mold into discrete batches which are separated upon extrusion from the mold member. A magazine is provided for storing the separator elements prior to their extrusion into the mold.

Brief description of the drawings

FIGURE 1 is a perspective view of the preferred embodiment for practicing the invention;
FIGURE 2 is an elevational view of the infeed side of the device illustrated in FIGURE 1;
FIGURE 3 is a sectional view taken along lines 3—3 of FIGURE 2;
FIGURE 4 is a sectional view taken along lines 4—4 of FIGURE 2;
FIGURE 5 is a sectional view taken along lines 5—5 of FIGURE 4 with portions of the structure removed for clarity;
FIGURE 6 is a sectional view similar to FIGURE 3 but illustrating certain operative parts in different positions; and
FIGURE 7 is a sectional view similar to FIGURE 6 but illustrating the operative parts in yet another position.

Description of the preferred embodiment

FIGURE 1 illustrates a preferred device for practicing the invention. The preferred device comprises a plurality of components on a support surface or frame 8 and includes a supply means comprising an infeed conduit 12 through which comminuted or ground food products 14 such as meat, for example, is forcefully fed by any suitable means to a hollow mold in the form of a tube 16 having an infeed opening 18 (FIG. 3) and an outfeed extrusion opening 20. Tube 16 is coaxial with infeed conduit 12 as shown in FIGURE 3 and tube 16 and infeed conduit 12 are connected to first and second rectangular attaching plates 22 and 23 respectively which clampingly embrace first and second guide plates 24 and 26 respectively. An upper spacer plate 28 and a lower spacer plate 30 maintain guide plates 24 and 26 in fixed spaced relationship as shown in FIGURES 1 and 4.

Storage of a plurality of separator elements 32 is effected by a tubular magazine 34 having an elongated opening 36 along its upper side and which is attached at one end to guide plate 24 by means of a third rectangular attaching plate 38 as shown in FIGURE 1. The other end of magazine 34 is supported by a bracket 39 attached to support surface 8. Guide plates 24, 26, and spacer plates 28, 30 are maintained in fixed position with respect to each other by readily disconnectable thumb bolt and nut assemblies 40 which also serve to retain the attaching plates 22, 23 and 38 in fixed position. Elements 24, 26, 28 and 30 are connected to provide an interior rectangular open space in which a reciprocable feed plate 42 is mounted for reciprocation by an air cylinder 44. Air cylinder 44 is mounted on a bracket 48 which is attached to supporting surface 8 in any convenient manner. Cylinder 44 includes a piston having a rod 50 extending outwardly in known manner and connected to reciprocable feed plate 42 by means of clevis 52.

Reciprocable feed plate 42 has a circular opening 54 extending completely therethrough in an interior portion thereof. However, it should be noted that it is sometimes necessary that one-half of opening 54 include a knife edge 56 formed at the intersection of a tapered portion 58 and opening 54 as shown in FIGURES 5, 6 and 7. However, in some instances it is not necessary to employ a knife edge for certain products. Reciprocable feed plate 42 is movable from a first position in which circular opening 54 is aligned with the end of tubular magazine 34 to a second position in which the circular opening 54 is aligned with and coaxial with infeed conduit 12 and hollow mold tube 16. The first position of reciprocable feed plate 42 is illustrated in FIGURE 6 and the second position is illustrated in FIGURE 3 with FIGURE 7 illustrating an intermediate position.

The stack of separator elements 32 maintained within tubular magazine 34 is constantly biassed in the direction of reciprocable plate 42 by bias block 58 which is best illustrated in FIGURE 4. A bracket 60 is attached to bias block 58 by thumb screws 62 and extends downwardly through a longitudinal slot 64 extending along the length of tubular magazine 34. Movement is imparted to bias block 58 by a cord 66 which is circular in cross-section and extends over pulleys 68 mounted for rotation on head brackets 60. Cord 66 is connected to free floating piston 72 mounted for reciprocation in a cylinder 74 which is attached at either end to head brackets 70. Cord 66 extends through airtight seal 76 on each head bracket and is freely movable within seal 76. Pressurized air from a conduit 78 is introduced into the right end of cylinder 76 to urge piston 72 to the left and consequently urge block 58 to the right so that separator elements 32 are biased toward reciprocable plate 42 in an obvious manner. When the bias block 58 moves to the vicinity of the dotted line position thereof illustrated in FIGURE 4, pressurized air is introduced through a second conduit 80 and conduit 78 is exhausted to cause piston 72 to move to the right and consequently move block 58 to an extreme leftmost position to enable refilling of tubular magazine 34.

In operation, comminuted food is continuously or intermittenly introduced through infeed conduit 12 and passed through mold tube 16 to be extruded from opening 20 into casing C having a diameter which enables the open end of the casing to be fitted over the outer periphery of tubular mold 16. A separator element 32 is shown in the closed and filled end of casing C as illustrated in FIGURE 1. While casing C is being filled, reciprocable feed plate 42 is maintained in the position illustrated in FIGURE 3 so that a continuous supply of food product can be introduced into tubular mold 16. However, cylinder 44 is actuated at desired time intervals to move plate 42 from the position illustrated in FIGURE 3 to the position illustrated in FIGURE 6. When plate 42 assumes the position illustrated in FIGURE 6, bias block 58 is moved so that the two separator elements 32 nearest plate 42 are moved into opening 54 as shown in FIGURE 6. The thickness of plate 42 is such that only two separator elements are accommodated within opening 54. The movement of plate 42 from its FIGURE 3 position to its FIGURE 6 position causes cutting edge 56 to slice through the food product 14 located in the path of movement of the cutting edge and the tapered surface 58 forces the food product in its path of movement into tubular mold 16. It will easily be seen that the particular structure of plate 42 results in opening 54 being substantially empty when it is moved to its FIGURE 6 position.

Reciprocable plate 42 is then moved to the right through the position shown in FIGURE 7 and carries the pair of separator elements 32 with it. Continued movement of plate 42 positions separator elements 32 coaxially with empty conduit 12 and tubular mold 16. Since the separator elements 32 are of slightly less diameter than the interior of tubular mold 16, the continued movement of food product 14 from conduit 12 forces the pair of separator elements into tubular mold 16 for movement therethrough as shown in FIGURE 3. The pair of separator elements 32 illustrated in FIGURE 3 effectively separates the food product into different batches. As pair 32' approaches opening 20, casing C is substantially full and the casing is removed with the forward separator element 32F within its interior but with the rear separator element 32R remaining in tubular mold 16. Since the separator elements have a natural adhesion to the food product which is greater than their mutual adhesion, the separation of the forward and rearward separator elements is easily achieved. Another casing is then inserted over tubular mold 16 and the rearward separator element 32R is moved into the forward end of the casing in the position of separator element 32 as illustrated in FIGURE 1. The casing which was removed from the tubular mold is then closed by conventional means on its open end to provide the finished product package 82 having flattened ends as shown in FIGURE 1. The foregoing steps are repeated in accordance with the number of packages desired to be prepared. It should be noted that the entire device is easily disassembled for cleaning by the simple expedient of loosening the bolt and nut assemblies 40.

It should be understood that the foregoing disclosure relates solely to a preferred embodiment for practicing the invention and that numerous modifications and alternations may be made therein without departing from the spirit and scope of the invention as set forth in the appended claims.

What is claimed is:

1. A method of providing elongated food product having flattened ends and being stuffed into casings, the steps of:
   continuously or intermittently forcing comminuted food product into a hollow mold for movement therethrough;
   inserting discrete pairs of abutting forward and rearward separator elements in said mold at given time intervals to provide distinct food product batches separated by said pairs of separator elements;
   positioning a first hollow casing to receive from said mold a first food product batch located between a rearward separator element of first pair of separator elements and a forward separator element of a subsequently inserted paid of separator elements; and
   subsequently positioning a second casing to receive from said mold a second batch of food product defined on its forward end by the rearward separator element of said second pair of separator elements and defined on its rearward end by the forward separator element of a third pair of separator elements; and
   closing said respective casings to retain said respective food product batches and said respective separator elements therein.

2. A method of providing cylindrical shaped ground food product batches with flattened end configuration, said method comprising the steps of:
   forcing said ground food product through a tubular mold and extruding said food product from said mold;
   inserting a pair of separator elements having outer peripheries which are substantially conformal with the inside of said tubular mold into said ground food product at desired time intervals for movement through said tubular mold to divide said food products into discrete batches at each pair of separator elements for subsequent insertion of said discrete batches into discrete casings.

References Cited
UNITED STATES PATENTS

| | | | |
|---|---|---|---|
| 2,099,638 | 11/1937 | Wiley | 17—32 |
| 2,669,749 | 2/1954 | Houland | 17—35 |
| 2,717,415 | 9/1955 | Gerhart | 17—32 |
| 2,751,306 | 6/1956 | Snyder | 99—176 X |
| 2,886,073 | 5/1959 | Beck | 141—313 |
| 2,912,924 | 11/1959 | Dahl et al. | 17—32 X |
| 3,233,281 | 2/1966 | Swift | 17—35 X |
| 3,283,361 | 11/1966 | Sommer | 17—38 |

TIM R. MILES, Primary Examiner

U.S. Cl. X.R.

17—32, 34; 53—123; 141—313